United States Patent [19]

Tomioka et al.

[11] 4,343,504
[45] Aug. 10, 1982

[54] ALL GLASS REAR DOOR ASSEMBLY FOR AN AUTOMOTIVE VEHICLE

[75] Inventors: Hirotaka Tomioka; Shuji Yamagata, both of Yokohama, Japan

[73] Assignee: Nissan Motor Co., Ltd., Yokohama, Japan

[21] Appl. No.: 145,950

[22] Filed: May 2, 1980

[30] Foreign Application Priority Data

May 7, 1979 [JP] Japan .............................. 54-60387[U]

[51] Int. Cl.³ .............................................. B62D 25/00
[52] U.S. Cl. ...................................... 296/76; 296/106; 49/485
[58] Field of Search .................. 296/76, 106, 56, 195; 49/485, 462

[56] References Cited

U.S. PATENT DOCUMENTS 4,183,575 1/1980 Hayashi ................................. 296/56
4,243,262 1/1981 Tokunaga ............................. 49/485

FOREIGN PATENT DOCUMENTS 2334553 7/1977 France .
818902 8/1959 United Kingdom .
1011168 11/1965 United Kingdom .
1251066 10/1971 United Kingdom .
1441545 7/1976 United Kingdom .

Primary Examiner—Robert R. Song
Attorney, Agent, or Firm—Thompson, Birch, Gauthier & Samuels

[57] ABSTRACT

An automobile rear glass door has a substantially flat main body portion and is angled at each side thereof to have side portions which cooperate with adjacent outer surfaces of a vehicle body when the rear door is in the closed position to define the contour of the vehicle. A weatherstrip is disposed on the vehicle body outer surfaces so as to contact the main body portion of the door glass inboard of the transition portion between the door's side portions and the door's main body portion when the rear door is in the closed position, thereby providing a positive environmental seal therebetween and improving the fit between the rear door edge and the adjacent vehicle body section.

7 Claims, 7 Drawing Figures

ALL GLASS REAR DOOR ASSEMBLY FOR AN AUTOMOTIVE VEHICLE

BACKGROUND OF THE INVENTION

The present invention relates in general to rear door assemblies of automotive vehicles and more particularly to an assembly in which the rear door is all glass.

In recent years, the number of cars equipped with all glass rear doors has increased dramatically. A typical construction of this kind of rear door is illustrated in FIGS. 1 and 2 and will be described hereinbelow.

In FIGS. 1 and 2, a rear door generally designated by the reference numeral 1, includes a substantially flat glass panel or door glass 2. The door 1 is hinged to a vehicle body by a hinge 3 so that it can be pivoted to open and close a rear access opening 4 of the vehicle body. As best shown in FIG. 2, when the rear door 1 is in the closed position, the door glass 2 forms an extension of an upper surface portion 6 of the rear side panel 5 to provide a refined appearance. The glass door 1 seats against an environmental-type seal 9, commonly called a weatherstrip. In this instance, if the door glass 2 does not properly seat against the weatherstrip 9, the exposed lateral edges of the door detract from the overall appearance of the vehicle.

FIG. 2 illustrates a typical construction of the weatherstrip 9 and its supporting flange 8 extending along the side of the rear access opening 4, to provide the seal between the door glass 2 and the vehicle body.

The conventional rear door 1 thus described has the disadvantage that it is relatively heavy and expensive since the door glass 2 must be relatively thick in order to obtain sufficient stiffness. Moreover, the conventional rear door has the additional disadvantage that the width $L_2$ (FIG. 2) tends to be quite large because of the necessity of the upper surface portion 6, thus decreasing the vision area of the door glass. In order to attain the refined appearance desired at each edge of the rear door by the arrangement of FIGS. 1 and 2, and also to maintain the structural integrity of the panel member 5, the width $L_1$ should be as wide as possible. As a result, the flange 8 must be positioned considerably inboard of the panel member 5 and accordingly the width $L_2$ extending from the lateral outside edge of the adjacent fender portion 6 to the weatherstrip 9 becomes correspondingly larger.

With a view to eliminating the above-mentioned disadvantages inherent in prior art glass rear doors, rear doors as shown in FIGS. 3 and 4 have been proposed in which the door glass 2 is curved at each side thereof to form a continuation of the exterior surface of the rear fender panel 5 thereby increasing the vision area of the door glass 2. This rear door 1 includes a sash 10 of a special shape which is fitted to the peripheral edge portion of the door glass 2 and which provides a weatherstrip-contacting surface which is located on a plane substantially perpendicular to the direction in which the rear door 1 is opened or closed. The weatherstrip-contacting surface of the sash 10 is, however, complicated in configuration, and requires high precision in manufacturing both the door glass 2 and the structure of the vehicle body defining the rear access opening 4, thus resulting in increased manufacturing costs.

It is accordingly an object of the present invention to provide an all glass rear door assembly of an automotive vehicle which is free from the foregoing drawbacks inherent in prior art rear door assemblies.

It is another object of the present invention to provide an all glass rear door assembly of the above described character which is simple in structure and capable of attaining an assured and positive seal between the door glass and each adjacent panel member, while improving rear door visibility and overall appearance of the vehicle.

BRIEF DESCRIPTION OF THE DRAWINGS

These and other objects and advantages of a rear door assembly of an automotive vehicle according to the present invention will become more clearly understood from the following description taken in conjunction with the accompanying drawings in which like reference numerals designate like parts throughout the several views thereof and in which.

DESCRIPTION OF THE PREFERRED EMBODIMENTS

Figure 1:
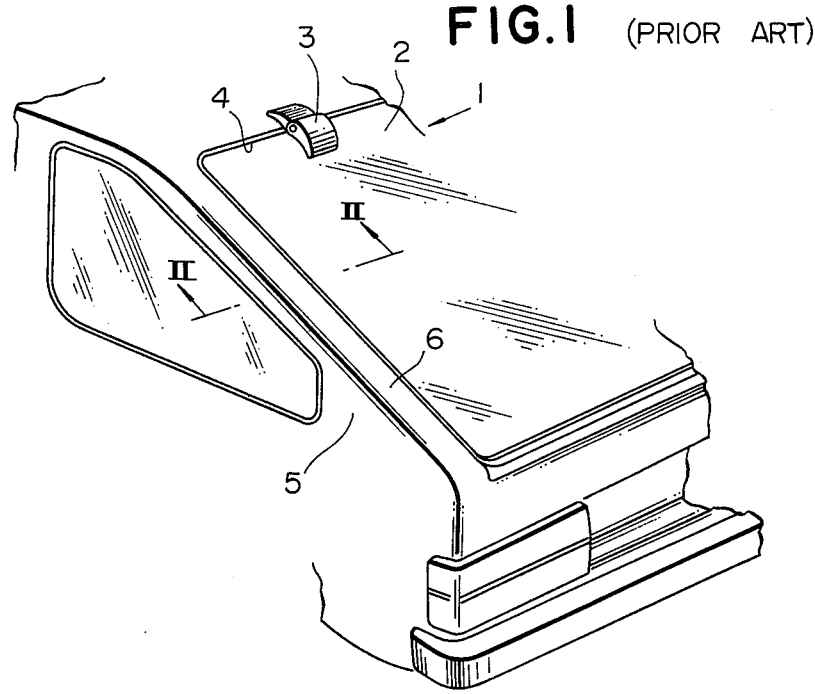
FIG. 1 is a partial perspective view of a prior art all glass rear door assembly.
Figure 2:
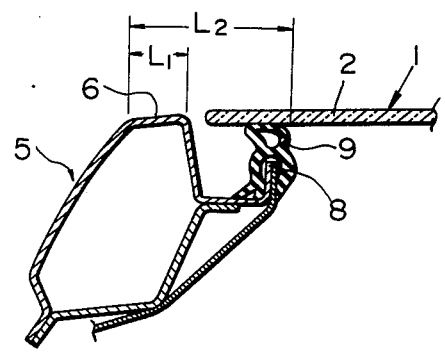
FIG. 2 is an enlarged cross sectional view taken approximately along line II—II of FIG. 1.
Figure 3:
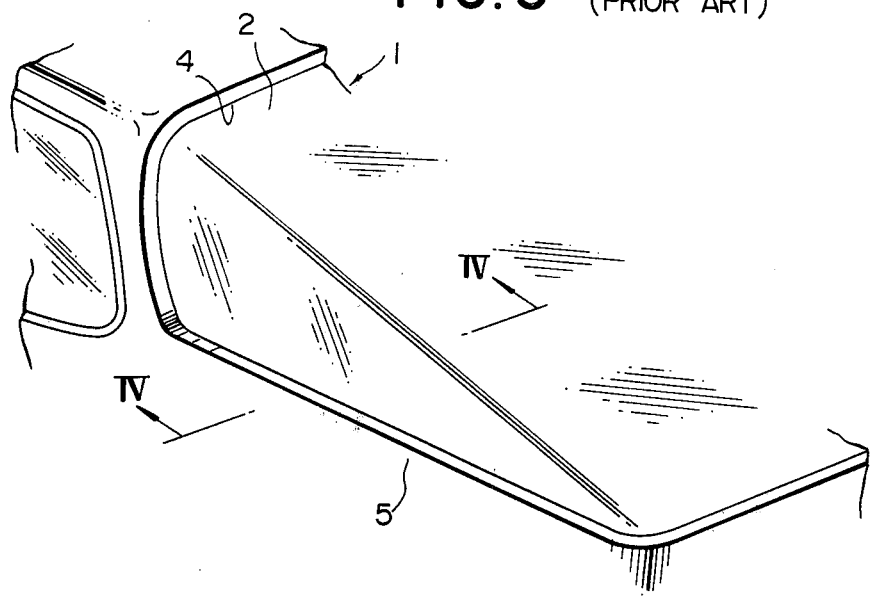
FIG. 3 is a partial perspective view of another prior art rear door assembly.
Figure 4:
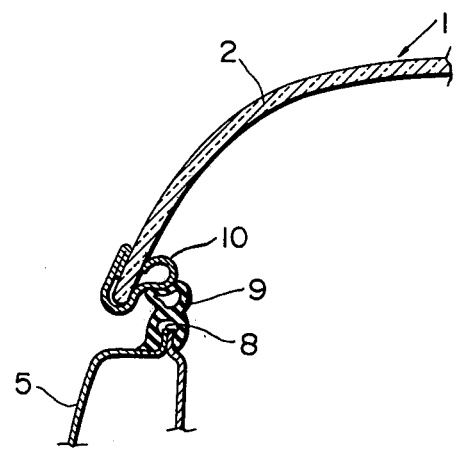
FIG. 4 is an enlarged cross section view taken approximately along line IV—IV of FIG. 3.
Figure 5:
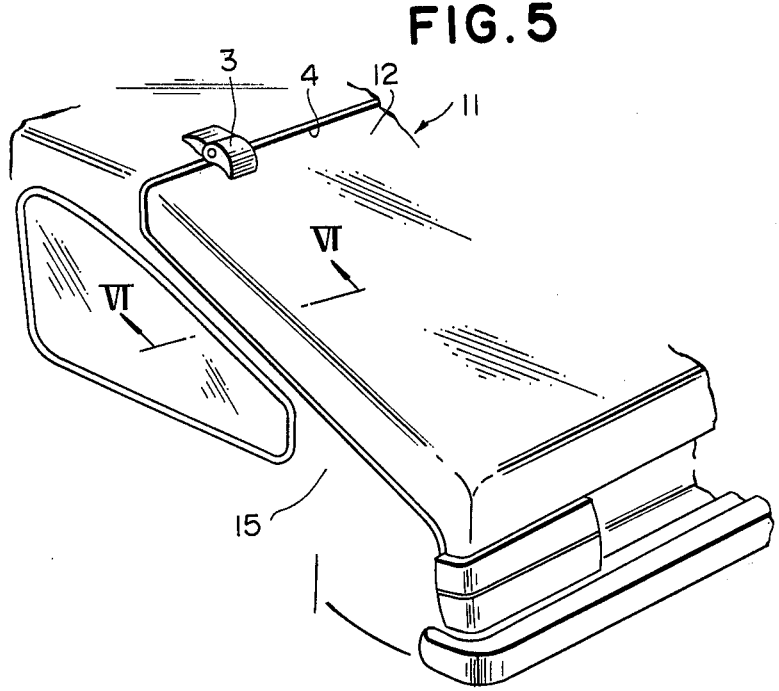
FIG. 5 is a partial perspective view of an all glass rear door assembly according to the present invention.
Figure 6:
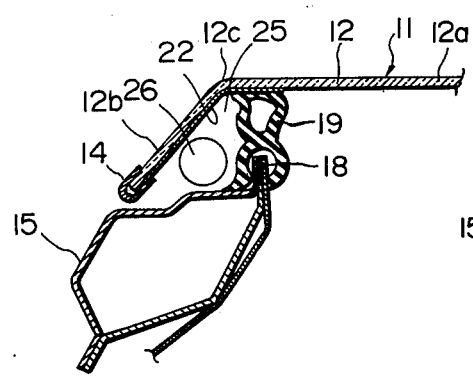
FIG. 6 is an enlarged cross sectional view taken approximately along line VI—VI of FIG. 5.

Referring to FIGS. 5 and 6, the present invention comprises an automotive vehicle rear door assembly including a rear door 11 in which there is provided a door glass 12 which is angled at each side thereof so as to be flush with the outer surface of the rear fender panel 15 defining the outer body of the vehicle. The door glass 12 has a substantially flat body portion 12a and at each side thereof a side portion 12b formed integrally therewith at a transition portion 12c. The rear door assembly is further provided with a weatherstrip 19 which is supported on its supporting flange 18 and so arranged as to sealingly contact the body portion 12a of the glass panel 12 immediately inboard of the transition portion 12c when the rear door is in the closed position.

As shown, the weatherstrip 19 is positioned to engage the flat body portion 12a immediately inboard of the glass transition portion 12c thereby increasing the area of visibility of the rear door. Furthermore, since the weatherstrip 19 is arranged to contact the flat body portion 12a of the door glass 12, a positive seal between the vehicle body and the door glass is obtained.

Figure 7:
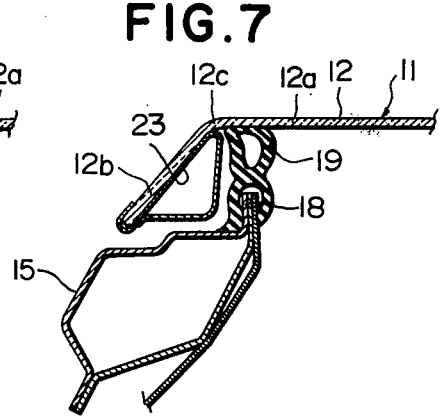
FIG. 7 is a view similar to FIG. 6 but showing another embodiment according to the present invention.

As shown in FIGS. 6 and 7, a device is provided for concealing the weatherstrip 19 from view, thereby improving the overall aesthetic appeal of the vehicle. In the embodiment shown in FIG. 6, this device takes the form of an opaque coating 22 applied to the underside of the glass panel side portion 12b, the transition portion 12c and at least a portion of the main glass body section 12a, as shown in FIG. 6. This coating 22 may be a ceramic coating or any suitable opaque coating bonded to or otherwise applied directly to the door glass 12.

In the alternative embodiment shown in FIG. 7, the concealing device takes the form of a structural channel member 23 attached to the inner surface of each glass door side portion 12b. This channel member 23 serves a dual function: as with the opaque coating 22, the channel member conceals the weatherstrip 19 from view, for aesthetic reasons. Additionally, the channel member imparts structural rigidity to the glass rear door 11.

In each embodiment shown in FIGS. 6 and 7, the glass door 11 may be provided with a structural aesthetic molding 14 attached to the periphery of the door. In addition to adding to the structural integrity of the rear door and improving the overall aesthetic appearance thereof, the molding 14 prevents the glass door from chipping when it accidentally strikes a foreign object.

The embodiment, shown in FIG. 6, also includes means 26 for controlling the opening and closing of the glass rear door. Means 26 is positioned in an elongate channel 25 defined by the weatherstrip 19, the body side fender panel 15 and the underside of the door glass side portion 12b. This control device 26 may comprise any of the conventional systems in use today for such a purpose.

Obviously, many variations and modifications of the present invention are possible in light of the above teachings. It is, therefore, to be understood that within the scope of the appended claims the invention may be practiced otherwise than as specifically described.

What is claimed is:

1. A glass rear door assembly for an automotive vehicle having a vehicle body formed with a rear access opening, said door assembly comprising:
   (a) a glass rear door hingedly mounted to the vehicle body in a manner to close the rear access opening, said door comprising:
      (i) a substantially flat main body portion;
      (ii) substantially flat side portions formed integrally with said main body portion and extending at an angle thereto to conform to the adjacent exterior surface portions of the vehicle body when said door is in its closed position;
      (iii) said main body portion and said side portions forming transition portions along their angled junction lines; and
   (b) a weatherstrip mounted on the vehicle body adjacent the access opening inboard of the body exterior surface portions, said weatherstrip sealingly contacting said rear door flat main body portion immediately inboard of said transition portions when said door is in its closed position.

2. The assembly as set forth in claim 1, further comprising an opaque member attached to the inner surface of said rear door side portions for concealing said weatherstrip from external view when said door is in its closed position, thereby enhancing the aesthetic appearance of the vehicle.

3. The assembly as set forth in claim 2, wherein said opaque member comprises an opaque coating applied to the inner surface of said rear door side portions.

4. The assembly as set forth in claim 2, wherein said opaque member comprises a structural channel member attached to the inner surface of said rear door side portions.

5. The assembly as set forth in claim 3, further comprising means for controlling the opening and closing of said rear door.

6. The assembly as set forth in claim 3 or 4, further comprising a structural aesthetic molding attached to said glass door at the peripheral edge thereof.

7. The assembly as set forth in claim 3, wherein said opaque coating is a ceramic material.

* * * * *